United States Patent
Feil et al.

(10) Patent No.: US 10,973,109 B2
(45) Date of Patent: Apr. 6, 2021

(54) INSTALLING OR CHANGING AN EXECUTABLE COMPUTER PROGRAM IN AN ILLUMINATION SYSTEM

(71) Applicant: OSRAM GMBH, Munich (DE)

(72) Inventors: Henry Feil, Unterhaching (DE); Christoph Peitz, Lippstadt (DE); Michel Stutz, Munich (DE); Karl-Heinz Wallwitz, Munich (DE); Andrej Wallwitz, Munich (DE)

(73) Assignee: OSRAM GmbH, Munich (DE)

( * ) Notice: Subject to any disclaimer, the term of this patent is extended or adjusted under 35 U.S.C. 154(b) by 39 days.

(21) Appl. No.: 16/470,126

(22) PCT Filed: Dec. 22, 2017

(86) PCT No.: PCT/EP2017/084352
§ 371 (c)(1),
(2) Date: Jun. 14, 2019

(87) PCT Pub. No.: WO2018/115425
PCT Pub. Date: Jun. 28, 2018

(65) Prior Publication Data
US 2019/0320518 A1   Oct. 17, 2019

(30) Foreign Application Priority Data
Dec. 23, 2016   (DE) ...................... 10 2016 125 631.5

(51) Int. Cl.
*H05B 47/19*   (2020.01)
*H05B 47/155*   (2020.01)
(Continued)

(52) U.S. Cl.
CPC ............... *H05B 47/19* (2020.01); *G06F 8/61* (2013.01); *G06F 8/65* (2013.01); *H05B 47/155* (2020.01)

(58) Field of Classification Search
None
See application file for complete search history.

(56) References Cited

U.S. PATENT DOCUMENTS

| 9,441,979 B2 | 9/2016 | Barnard et al. |
| 2014/0252958 A1 | 9/2014 | Subotnick et al. |

(Continued)

FOREIGN PATENT DOCUMENTS

| CN | 104619082 A | 5/2015 |
| CN | 106091257 A | 11/2016 |
| WO | 2016112815 A1 | 7/2016 |

OTHER PUBLICATIONS

PCT; App No. PCT/EP2017/084352; International Search Report and Written Opinion dated Apr. 16, 2018.
(Continued)

*Primary Examiner* — Dedei K Hammond
(74) *Attorney, Agent, or Firm* — Viering, Jentschura & Partner MBB

(57) ABSTRACT

The invention relates to a method for installing an executable computer program in an illumination system having a plurality of illumination devices which are controlled by means of a particular computer unit and have a lighting device and a transmitting device arranged in or directly on the lighting device, wherein the transmitting device wirelessly emits a signal having an item of identification information specific to the transmitting device, in which: data corresponding to the computer program to be installed are provided by a data source, the data are transmitted to the illumination devices and the computer program is automatically installed in the respective computer units of the illumination devices on the basis of the transmitted data, wherein a first of the illumination devices receives the data via a communication link, and in order to install the computer program in at least one second of the illumination
(Continued)

devices, the first of the illumination devices transmits the data to the at least one second of the illumination devices.

19 Claims, 6 Drawing Sheets

(51) Int. Cl.
    *G06F 8/61*         (2018.01)
    *G06F 8/65*         (2018.01)

(56) References Cited

U.S. PATENT DOCUMENTS

2015/0369618 A1    12/2015    Barnard
2016/0242264 A1*    8/2016    Pakkala ................ H05B 47/19

OTHER PUBLICATIONS

Chinese search report issued for the corresponding CN application No. 201780080307.9 dated Dec. 2, 2020, 2 pages (for informational purposes only).

\* cited by examiner

INSTALLING OR CHANGING AN EXECUTABLE COMPUTER PROGRAM IN AN ILLUMINATION SYSTEM

CROSS-REFERENCE TO RELATED APPLICATIONS

This application is a U.S. national phase application of International Application No. PCT/EP2017/084352, filed Dec. 22, 2017, designating the United States, which claims priority to German Patent Application No. 10 2016 125 631.5, filed on Dec. 23, 2016.

FIELD

The invention relates to a method for installing or changing an executable computer program in an illumination system with a plurality of illumination devices controlled by means of a respective computer unit, which comprise a lighting device and a transmitting device arranged in or immediately at the lighting device, wherein the transmitting device wirelessly emits a signal with identification information specific to the transmitting device, in which data corresponding to the computer program to be installed or to be changed is provided from a data source, the data is communicated to the illumination devices and the computer program is installed in the respective computer units of the illumination devices in automated manner or an already installed computer program is changed in automated manner based on the communicated data. Furthermore, the invention relates to an illumination system with a plurality of illumination devices controlled by means of a respective computer unit, which comprise a lighting device and a transmitting device arranged in or immediately at the lighting device, wherein the transmitting device is formed to wirelessly emit a signal with identification information specific to the transmitting device, wherein the illumination system comprises a data source connection for connecting to a data source providing data corresponding to a computer program to be installed or to be changed, wherein the illumination devices are formed to install the computer program in the respective computer units of the illumination devices in automated manner or to change an already installed computer program in automated manner based on the communicated data.

Furthermore, the invention relates to a method for installing or changing an executable computer program in an illumination system with a plurality of illumination devices, which comprise a lighting device, a transmitting device arranged in or immediately at the lighting device and a respective computer unit, wherein the transmitting device wirelessly emits a signal with identification information specific to the transmitting device, in which data corresponding to the computer program to be installed or to be changed is provided from a data source, the data is communicated to the illumination devices and the computer program is installed in the respective computer units of the illumination devices in automated manner or an already installed computer program is changed in automated manner based on the communicated data. Finally, the invention also relates to an illumination system with a plurality of illumination devices, which comprise a lighting device, a transmitting device arranged in or immediately at the lighting device and a respective computer unit, wherein the transmitting device is formed to wirelessly emit a signal with identification information specific to the transmitting device, wherein the illumination system comprises a data source connection for connecting to a data source providing data corresponding to a computer program to be installed or to be changed, wherein the illumination devices are formed to install the computer program in the respective computer units of the illumination devices in automated manner or to change an already installed computer program in automated manner based on the communicated data.

BACKGROUND

Fundamentally, Illumination systems, illumination devices as well as also lighting devices and transmitting devices of the generic type are extensively known in the prior art such that a separate printed evidence is not required hereto. Rooms, for example outside of or also within buildings, are illuminated by illumination systems in presettable manner to allow or support intended use. Illumination devices are increasingly employed for the illumination systems, which besides a lighting device, which emits light in presettable manner, also comprise a transmitting device, which is at least formed to wirelessly emit specific identification information, for example in the manner of broadcast. Preferably, this transmitting device is formed to emit the signal in the manner of near-field radio. Such a transmitting device is also referred to as "beacon" in the prior art.

So-called beacons can be combined with lighting devices to provide lamp-specific or also other information by means of their signal. The beacon technology is based on a transmitter system or also a transceiver system. A beacon (in German also Leuchtfeuer, Bake or Peilsender) is a small, mostly battery-operated transmitter, which emits a signal in, preferably definable, time intervals, for example based on a Bluetooth Low Energy (BLE) standard. The signal of a beacon is characterized by the identification information, which for example includes a unique identification number, for example termed universally unic identifier (UUID) in English. Beacons can be used to assign an, in particular digital, identification to objects and/or locations. Objects, at which a beacon is installed, as well as also locations, at which a beacon is installed, for example on a wall or a ceiling, can be identified by communications terminals, for example smartphones, laptops and/or the like, in the signal field of the beacon in this manner.

Thereby, a location can for example be identified and localization can be performed, respectively, with the aid of a beacon. By arranging one or more beacons in a preset region, for example a building region or the like, a type of radio-based raster can be provided, which allows a communications terminal located in the region ascertaining the own position by means of its radio interface, in particular BLE interface, as well as corresponding evaluation possibilities. Therein, the individual identification numbers of the installed beacons give an identifier to a location, based on which the communications terminal can, at least approximately, determine the position. Anyway, a transmission area of a respective beacon can basically be ascertained. By suitable evaluation, for example using preset algorithms or the like, the accuracy of the ascertained position can be improved, for example by evaluating a signal strength and/or the like. Hereto, the communications terminal can preferably access data of a data storage, for example via a communication network like the Internet and/or the like. The data storage can for example be a Cloud server or the like. Here, the identification number and an associated position can for example be noted in a map.

If the communications terminal comes into the range of the transmitting device or the beacon, it can thus ascertain the own site for example via server query based on the ascertained identification number. Using further signals of further transmitting devices or beacons, the accuracy can be improved by means of localization algorithms, in particular a distance can be ascertained from a receiving field strength of the respective signal of the transmitting device or the beacon.

Basically, transmitting devices or beacons can be installed at illumination systems of the generic type in the light technology. Therein, the advantage is in particular utilized that a light installation provides a permanent energy access to supply the transmitting device or the beacon with electrical energy. An advantage results from it, namely that the transmitting device or the beacon does not require an own energy supply in the form of a battery and thus corresponding maintenance expenditure can be saved. Moreover, this configuration allows that settings of the transmitting device or the beacon can also be chosen, which entail high energy consumption without having effects on a lifetime of the beacon. Moreover, installation processes of such transmitting devices or beacons and the light technology can be unified. A further advantage is a defined locking position of the transmitting device or the beacon, which is preferably selected such that the transmitting device or the beacon is protected from manipulation. Thereby, a reliable secure identifier can thus be assigned to a location.

An overview over use potentials of the integration of a transmitting device or a beacon in an illumination device can be taken from the following enumeration:
- The energy supply of the light installation can be used instead of an energy supply by a battery to for example reduce lifecycle cost of the transmitting device or the beacon.
- The electrical energy supply of the illumination system can be used to adapt transmission parameters of the signal of the transmitting device or the beacon to the service and not to an available residual amount of energy or parameters of the battery. Frequent transmission cycles for example generate a high accuracy of a respective service, however, this also results in increased energy consumption.
- The exchange of the battery of conventional transmitting devices or beacons bears risks, namely for example with regard to errors in the handling.
- A non-availability of services can be avoided by an uninterrupted energy supply of the transmitting device or the beacon.
- An installation location below a ceiling is advantageous for a signal propagation of the signal of the transmitting device or the beacon.
- An installation location below the ceiling can make the overall system more robust against disturbances and shadings, respectively, by other objects at the level of a floor level in contrast to an installation of the transmitting device or the beacon itself at the level of the floor level.
- The transmitting device or the beacon can be protected from manipulations and unauthorized accesses, respectively, whether unintentional or intentional.
- An illumination system as well as also services such as for example localization services or the like can be offered as an overall system "from a single source".
- Moreover, there is the possibility of using a secure communication network of the illumination system to for example configure the transmitting device or the beacon or to link the transmitting devices or the beacons with each other.
- A unification of installation processes of transmitting devices or beacons and the illumination system can be allowed.
- Furthermore, there is the possibility of coupling to further system elements of a peripheral building infrastructure via the communication network of the illumination system, for example to elements of the safety technology or the like.
- An optically attractive illumination system can be provided since the transmitting device or the beacon can be non-visibly arranged in the respective illumination device or in the illumination system.

A beacon can be integrated in an illumination device of an illumination system as a transmitting device. The illumination system can include a plurality of illumination devices. The illumination device includes the lighting device besides the beacon, which provides the desired illumination function by means of one or more illuminants. The beacon and the lighting device are in communication link with each other. The beacon is preferably arranged integrated in the lighting device. Thus, a separate housing does not have to be provided for the beacon. Thereby, the beacon can be arranged protected at the same time such that the intended function can be provided with high reliability. Further illumination devices of the illumination system are preferably formed identical to the illumination device.

The beacon is formed to wirelessly emit a signal with identification information specific to the beacon. Preferably, the emission is effected by radio using a BLE standard. Further, the beacon preferably includes a control unit, which includes a computer unit as well as a storage unit. An executable computer program is stored in the storage unit, which is provided for the computer unit such that a preset control function can be achieved by means of the computer unit.

Further, the beacon can be connected to further local beacons via a communication link. The communication link is presently also formed as a wireless communication link according to the BLE standard. The communication link between the beacon and the further beacons is preferably bidirectional.

Moreover, the beacon can be connected to a data infrastructure device via a further communication link. The data infrastructure device can serve for controlling the illumination system, here in particular the illumination devices. The infrastructure device can for example be the Internet or else a central service server. The data infrastructure device can further serve for controlling and/or communicating data. The local beacon of the illumination device can be formed as a pure transmitting device in the manner of a broadcasting operation or also as a combined transmitting-receiving device.

The signal of the beacon can be received by means of communications terminals such as for example a smartphone, a LAPTOP and/or the like.

According to an example of use, humans and appliances, respectively, can optionally have the challenge to have to orient themselves, to navigate or to locate and use other local digital services, respectively, within a region, such as for example apps, app functions, Google Maps, Lightify, light control and/or the like. The illumination system with integrated beacons in a preset region can become a localization and orientation system, respectively, for these potentials of use. With a self-localization of the communications terminal realizable thereby, services can now be provided, for example a navigation, provision of location-specific information and/or the like.

An aspect of the beacon technology is the possibility of configuration of typical parameters such as for example a signal strength, a transmission interval and/or the like of the beacon. With different configurations, different scenarios of application can be individually supported. For example, if a high service quality with respect to an accurate localization in short intervals is desired, for example in indoor navigation, very short transmission intervals are for example able to be configured.

In particular in digitally controlled illumination systems, for example using Digital Addressable Lighting Interfaces (DALI), it should be possible to uniquely identify, which illuminant or which lighting device is arranged at which location, to allow an exact control of the lighting devices or the illuminants thereof in a certain region by means of digital light control. Hereto, the lighting devices require a unique address, which reflects their position in a preset region. The expert refers such an assignment of lighting devices to corresponding positions or addresses as to "commissioning". Herein, multiple information has to be combined, namely unique identification information of a respective lighting device, an installation location of a respective lighting device in a preset region, that is a physical address of the lighting device, as well as an identifier of the lighting device, that is for example its digital address.

The digital address of a lighting device can usually be communicated to a control or data processing via power line communication or a similar power-based communication solution via the energy distribution. The lighting device or a ballast of the lighting device thus signs up at the control with its digital address. However, the information is thereby not yet available, at which physical location in the preset region the lighting device is actually arranged. However, this information is required if only a defined region is to be lighted, for example only a conference room or a part thereof or the like.

At present, illumination systems and illuminants, respectively, and at the same time the site thereof usually cannot be readily electronically identified. Typically, it can only be recognized via a label or an impressing, for example on a housing of the lighting device, which type of the lighting device or the illuminant it is. Another expensive possibility is in causing each digitally signed up lighting device within the scope of the illumination system to individually blink and in manually marking position information in a layout.

In order to efficiently connect lighting devices and/or illuminants within the scope of the illumination system to a light management system (LMS), it would be advantageous to have available one or more electronic and digital identification numbers, respectively, for recognizing the overall system or individual components of the overall system.

Further, a specific problem is in that positions of the lighting devices or illuminants are usually set in an installation plan for an illumination region or service region. This presets to an installer, which of the delivered and commissioned lighting devices, respectively, for example with respect to a lamp type or the like, are to be arranged in which position of the region, for example the building, corresponding to the installation plan.

Location-related employments or services, such as for example navigation of a user or the like, by means of beacons are to be available to the user in a preset region, preferably in permanent manner and without restriction. Besides an uninterrupted electrical energy supply, this also requires regular maintenance and optionally also update of computer programs such as for example the firmware or the like, respectively. In particular, firmware updates of technical systems are of high importance. They usually serve for error elimination, power optimization as well as optionally also for functional extension of the technical system. Thus, errors, so-called bugs, can for example be fixed, whereby the reliability can be increased. Moreover, security gaps can be closed or technical functions of the system can subsequently be enabled or turned off. Thus, high demand of performing firmware updates in regular, in particular situation-specific intervals, is explained.

However, at present, firmware updates in transmitting devices or beacons require high effort for a respective service provider or operator of the technical system and thereby high lifecycle cost.

Thus, it is for example required to individually manually establish a communication link with each transmitting device or each beacon correspondingly to be processed to be able to transfer the data for the installation or the change of the respective computer program. This can result in the fact that required firmware updates are not performed caused by resources, for example due to personnel capacities or cost, and thus the respective services, in particular location-related services, are not available with the desired reliability on the one hand and potential security gaps are not closed on the other hand. Both substantially counteract a further market penetration because acceptance of the users or operators thereby suffers.

Therefore, it is desired to configure an expensive distribution of firmware updates to the transmitting devices or beacons as well as also a process of the firmware update for the respective service provider or the operator as simple and time-efficient as possible.

Therefore, it is the object of the invention to improve installing or changing an executable computer program in an illumination system with a plurality of illumination devices controlled by means of a respective computer unit.

SUMMARY

A method as well as an illumination system according to the independent claims is proposed as the solution by the invention.

Further advantageous configurations are apparent based on features of the dependent claims.

With respect to a generic method, it is in particular proposed that a communication link exists between the illumination devices, at least a first one of the illumination devices obtains the data from the data source, and for installing or changing the computer program in at least one second one of the illumination devices, the first one of the illumination devices communicates the data to the at least one second one of the illumination devices via the communication link.

With respect to a generic illumination system, it is in particular proposed that a communication link exists between the illumination devices, at least a first one of the illumination devices is formed to obtain the data from the data source, and for installing or changing the computer program in at least one second one of the illumination devices, the first one of the illumination devices is formed to communicate the data to the at least one second one of the illumination devices via the communication link.

The invention allows providing the data required for the installation or the change of the computer program only to one of the illumination devices, preferably one of the transmitting devices. The data can then be communicated to the further illumination devices via the communication link with the further illumination devices without a separate own immediate communication link with the data source being required thereto. In ideal case, thus, the data source only has to be communicatively connected to a single, namely the first one of the illumination devices to obtain the data. The data can then be distributed in nearly arbitrary manner within the illumination system, namely using the communication link between the illumination devices.

Of course, the illumination system with the plurality of illumination devices can thereby also be treated in simple manner with respect to firmware updates. Thereby, the expenditure for firmware updates can be considerably reduced. Of course, it can also be provided that the data source is connected to two or more of the illumination devices to transfer the data. Thereby, a data transfer rate can be increased. It proves particularly advantageous if two or more of the illumination devices are supplied with the data as the first illumination devices and can be used for distributing the data to the further, second illumination devices. Thereby, fast installation or fast change of the respective computer programs can be achieved in illumination systems with a great number of illumination devices. In this manner, an update process can be flexibly performed without great manual effort—preferably controlled via central access—for example at a time, at which services provided by the transmitting devices or beacons are not required. Thereby, high availability of the illumination system can overall be achieved.

Each of the illumination devices includes a lighting device as well as a transmitting device assigned to it, which is arranged in or immediately at the lighting device. Thereby, the transmitting device is spatially assigned to the lighting device and constitutes the illumination device together with the lighting device as well as optionally with further units. Thus, the illumination device can provide an illumination function by means of the lighting device, which includes one or more illuminants hereto. At the same time, an additional functionality is provided by the transmitting device, namely in that the transmitting device wirelessly emits the signal with the identification information specific to the transmitting device. The identification information is preferably contained in the signal of the transmitting device in the form of data. The data can contain digital or also analog data. Preferably, the identification information is a code signal uniquely assigned to the respective transmitting device. Thereby, each of the illumination devices becomes identifiable, namely in that the signal respectively emitted by the transmitting device is received and the specific identification information contained therein is ascertained.

According to a first aspect, the illumination devices of the illumination system are controlled by means of the respective computer units. This allows providing a plurality of functionalities for the illumination devices, which can be realizable and/or adaptable in simple manner. However, according to a second aspect, the illumination devices do not have to be necessarily controlled by the respective computer units. Furthermore, it can also be provided that the computer units serve for the function of the transmitting device or the beacon. Of course, combinations hereof can also be provided. Further, it can be provided that only a part of the illumination devices and/or the transmitting devices or the beacons is controlled by means of the computer units.

Furthermore, the respective lighting device and the respectively assigned one of the transmitting devices or beacons can be in communication link, for example via a suitable BUS or the like. The communication link can be wired or also wireless. Fundamentally, this can also be provided for communication of the computer units. They can communicate with the respectively assigned ones of the transmitting devices or beacons on the one hand and/or the assigned lighting devices on the other hand via a suitable BUS. The BUS is preferably an Intra Luminaire Bus (ILB).

Within the scope of the invention, thus, an overall system as an illumination system as well as a method coupled thereto, in particular for updating a firmware of a transmitting device, which is arranged in or at or as part of the illumination device, is proposed. The communication link between the illumination devices can for example be formed in the manner of a network, in particular as a mesh network. In particular, it can be provided that the transmitting devices or beacons of the illumination devices can communicate with each other. It proves particularly advantageous if the illumination devices and/or the computer units can thereby also communicate with each other. The communication can for example be based on radio, in particular on near-field radio, and use a suitable radio protocol. A radio protocol can for example be Bluetooth, ZigBee or the like. The transmitting device can also function as a network node in a preset service region and be supplied with electrical energy via the illumination device or the lighting device or illuminant. Thus, an expensive energy converter does not have to be provided, in particular if an electrical connection of the transmitting device in parallel with light emitting diode modules as the illuminants of the lighting device is provided. The light emitting diode modules can possibly also be combined to a light emitting diode carrier module by groups of light emitting diodes.

Further, it can be provided that at least one specifically preset transmitting device or one specifically provided beacon provides a relay function to allow communication between transmitting devices or beacons, which are not arranged in communication range to each other. Preferably, the specifically preset transmitting device or the specifically preset beacon can be spatially arranged between the transmitting devices or beacons, between which the communication is to be achieved. Thereby, a communication distance can also be bridged, which exceeds the communication range between adjacently arranged transmitting devices or beacons. Of course, the communication distance can also be bridged by means of multiple specifically preset transmitting devices or specifically preset beacons.

Preferably, the transmitting device is a transmitting-receiving device in the manner of a mesh-enabled device, which establishes a meshed network with further transmitting devices located in the environment, which in turn can also be arranged in or at or as part of a lighting device or an illuminant. In this case, each of the transmitting-receiving devices can function as a network node, which is connected to one or more other transmitting-receiving devices in the same installation region, preferably in wireless manner and/or via the communication network of the illumination system formed by the communication links, preferably via BLE. Data can be forwarded and distributed between nodes within this meshed network.

Preferably, the overall system can be extended by one or more further mesh-enabled transmitting-receiving devices, which are not integrated in or at or as part of the illumination device or the lighting device or the illuminant, for example in the manner of a battery-operated beacon. By the arrangement of additional transmitting-receiving devices, gaps in the overall system can for example be closed and/or the service region can be expanded, in particular afterwards.

Fundamentally, the transmitting device includes at least one transmitting unit. However, it can additionally also include a receiving unit such that a transmitting-receiving device is formed. Moreover, the transmitting device can of course also include communication interfaces in particular for providing the communication link. Therefore, the transmitting device can also be a transmitting-receiving device.

In particular, in an illumination system or an illumination device or a lighting device with integrated mesh-enabled transmitting-receiving device such as for example a beacon, firmware update can be achieved. The transmitting-receiving device is installed in a preset service region for this purpose. By the firmware update, functions are for example to be subsequently enabled, security gaps are to be closed and/or an energy efficiency is to be improved. In order to counteract an expensive distribution process of the firmware update for example via manual distribution of the data via respective direct connections of a terminal to each individual transmitting-receiving device, the data of the firmware update or the computer program is distributed in automated manner via the mesh network or the communication link between the illumination devices, which is established by the transmitting-receiving devices integrated in the illumination devices or lighting devices or illuminants.

Subsequently, various variants, how the firmware update can for example be distributed within the overall system, are further explained. In particular, the overall system includes a compound of multiple transmitting-receiving devices, which are arranged in or at or as part of illumination devices, lighting devices or illuminants.

Preferably, it is proposed that it is examined in the second one of the illumination devices if the data for installing or changing the computer program of the second one of the illumination devices is provided. This configuration takes into account that the illumination devices and the transmitting devices thereof, respectively, as well as also the computer units thereof do not have to have an identical functional extent. Insofar, installing or changing the present computer program cannot be required, possibly also entail malfunctions. Therefore, the illumination device examines if the received data is suitable for the installation or the change of the present computer program. For example, this can be effected based on version numbers or the like, which are associated with respective suitable illumination devices and transmitting devices, respectively, and which can be contained in the data. Thereby, it can be achieved that an installation of the computer program or change of the computer program is only effected if the transmitting device is also fundamentally suitable hereto.

Moreover, it is proposed that the second one of the illumination devices communicates the data to at least one further one of the, in particular second, illumination devices via the communication link. Hereby, it can be achieved that the first one of the illumination devices does not have to be immediately in communication link with each of the second ones of the illumination devices. Here, a concatenated data communication can be achieved, wherein the data is successively communicated from one of the illumination devices to the next one of the illumination devices. Therein, it can be provided that the data is supplemented to the effect that information about the illumination devices is contained, which already have obtained this data. Thereby, data circulation between the illumination devices connected via the communication link can be avoided.

Advantageously, it can be provided that the communication link is terminated after communicating the data. In this configuration, the communication link only has to be activated for communicating the data. If data communication is terminated, the communication link can also be deactivated. Thereby, energy consumption can for example be reduced.

Furthermore, it can be provided that the data is stored in a storage unit of the illumination device in the first one of the illumination devices. Thereby, the data is also available for further communications and installations, respectively, at a later point of time. Accordingly, the first illumination devices and the transmitting devices thereof, respectively, do not have to immediately install or change their computer programs at the same time. Thereby, it is possible to at least partially maintain the function of the illumination system also during the intended operation such that at least partial operation can also be maintained during the installation or change of the computer program. The storage unit can be a constituent of the computer unit. However, it can also be a separate assembly, which is preferably encompassed by the transmitting device.

Furthermore, it is proposed that the data is communicated from the first illumination device to the at least second one of the illumination devices by it only after installing or changing the computer program of the first illumination device. This configuration has the advantage that the function of the installed computer program or the changed computer program can first be examined at the first one of the illumination devices before the data is communicated to the second ones of the illumination devices. If malfunctions should appear, the communication of the data to the second ones of the illumination devices can be suppressed such that at least the operation of the second ones of the illumination devices can be reliably continued. This configuration allows at least partially maintaining reliable operation of the illumination system even with data damaged by malfunctions.

Further, it proves advantageous if the installation or the change of the computer program is effected at a preset point of time. The point of time can for example be contained in the data. Preferably, the point of time is selected such that the functionality of the illumination device and the transmitting device, respectively, does not have to be available. For example, this can be the case if the service does not have to be provided in a service region at a certain point of time and in a certain period of time, respectively, for example if users with communications terminals are not present in this period of time and at this point of time, respectively, or the like.

A development proposes that the point of time at least depends on an operating state of the respective illumination device. Thus, it can be provided that the installation of the computer program or the change of the computer program is only effected if the function of the illumination device is for example deactivated because an illumination function is fundamentally not required at the selected point of time. The point of time can basically also determine a corresponding period of time. Moreover, points of time and periods of time, respectively, can also be provided, in which the illumination system is overall deactivated. This can for example be the case if maintenance of the entire illumination system is performed, a region, in which the illumination system is located, is not used, and/or the like.

It proves particularly advantageous if the point of time for installing or changing the computer program depends on installation information contained in the data. Thus, it can for example be provided that the installation can be controlled by a date specification. Thereby, it can for example be ensured that all of the illumination devices and the transmitting devices, respectively, install or change the computer program substantially at the same time with a change of date. In addition to the date, a time of day can of course be provided. This allows first distributing the data to all of the relevant or desired illumination devices and transmitting devices, respectively, and only if the data is distributed to all of the relevant or desired illumination devices and transmitting devices, respectively, performing installation or change of the computer program. Thereby, a unitary functional scenario can be achieved for the entire illumination system.

Furthermore, it can be provided that the point of time depends on the availability of electrical energy for an intended operation of the respective illumination device. Thus, it can be provided that the point of time is selected such that sufficient electrical energy is available to be able to perform the installation of the computer program or change of the computer program. This point of time can for example be dependent on an operating period of time and operating point of time of the entire illumination system, respectively. It can also be provided that a serial installation or a serial change of the computer programs is allowed such that an overall energy consumption of the illumination system by the installation of the computer programs or the change of the computer programs can be limited.

Furthermore, it is proposed that the first one of the illumination devices recognizes a new second illumination device and communicates the data to the new second one of the illumination devices in automated manner. This configuration allows recognizing, in particular subsequently, added illumination devices to the illumination system and updating the computer programs thereof or correspondingly providing them with a computer program by the communication of the data such that an intended function within the scope of the entire illumination system can be achieved. Thus, in this configuration, it is not required to previously provide the newly added second one of the illumination devices with a suitable computer program or a suitable version of a computer program. This automatically occurs after the mechanical and/or electrical installation in the intended operation of the new second illumination device within the scope of the illumination system. Thereby, the adaptation of the illumination system can be considerably simplified. Moreover, this configuration also allows simplification with respect to maintenance, for example exchange of a defective illumination device and a defective transmitting device, respectively, and/or the like.

According to a development of the invention, it is proposed that at least one presettable active functionality of the illumination device is deactivated and/or a presettable deactivated functionality is activated during the installation or change of the computer program. Thereby, it can be achieved that undisturbed installation or change of the computer program can be realized. In that a functionality, which could be disturbed by the installation or change of the computer program, is deactivated, the reliability of the illumination system can be overall improved. The same fundamentally applies to the case that during the installation or change of the computer program, an otherwise deactivated functionality is activated. Such a deactivated functionality could for example be a warning message, which informs that the illumination device and the transmitting device thereof, respectively, are currently not available or the like.

Further, it is proposed that a functionality available in a respective one of the illumination devices is activated or deactivated by installing or changing the computer program. This configuration takes into account that the illumination device and the transmitting device thereof, respectively, are formed for providing a functionality in terms of hardware, which can be activated and deactivated by means of the computer program, respectively. In this manner, a functionality of the illumination device and the transmitting thereof, respectively, can for example be supplemented or also limited, according to need. Of course, additional functionalities, which appear to be convenient only after installing the illumination system, can in particular be additionally activated in this respect. Of course, it can moreover be provided that other functionalities, in particular those, which are not compatible with new functionalities, are correspondingly deactivated.

Preferably, the illumination system and the illumination device, respectively, of the concerned service region comprise a separate, for example wireless or wired, communication link with an IT infrastructure. Based on this IT infrastructure, for example a service server, a Cloud, a content management system and/or the like, which can automatically draw and manage firmware updates from central servers, the data of a firmware update is for example transferred via a gateway and a communication channel of the light management system of the illumination system and the illumination device, respectively, to the mesh-enabled transmitting-receiving device. Hereto, an internal communication link is preferably provided in the illumination system with integrated transmitting-receiving device. Subsequently, the firmware update can be copied to a buffer of the transmitting-receiving device and installed on a main storage after examination. Alternatively, the firmware can also be directly stored in a main storage. In a next step, the data of the firmware update can then be distributed to all of the further mesh-enabled transmitting-receiving devices, wherein it can optionally be determined, which requirements the transmitting-receiving devices have to satisfy to receive the firmware update, or at which point of time the distribution of the firmware update is to be effected. Therein, the transfer can be effected in wireless manner, for example via the BLE standard or the like, or also in wired manner, for example via an existing communication network of the illumination system or the like. For the distribution itself, a mesh network can for example be established in steps or an already existing mesh network can be used, in which the transmitting-receiving devices for example function as network nodes and the information can be passed from node to node.

Based on the IT infrastructure, the data of the firmware update can be immediately wirelessly transferred to a preferably primary mesh-enabled transmitting-receiving device via the gateway. Subsequently, the firmware update can be copied to a buffer of the transmitting-receiving device and installed on the main storage after the examination. Alternatively, the data for the firmware update can also be directly written into the main storage. In a next step, the data of the firmware update can then be distributed to all of the further mesh-enabled transmitting-receiving devices, wherein it can optionally be determined, which requirements the transmitting-receiving devices have to satisfy to receive the firmware update, or at which point of time the distribution of the firmware update is to be effected. Therein, the transfer can be effected—as explained above.

Furthermore, it can be provided that a direct communication link from a communications terminal, for example a mobile radio terminal like a smartphone or the like, to one of the transmitting-receiving devices is established via a wireless communication channel, preferably according to the BLE standard or the like. The data of the firmware update can then be transferred via this link and subsequently be installed on the transmitting-receiving device. The method for distributing to the transmitting-receiving devices, in particular located in the environment, is effected as already above described.

Furthermore, it can be provided that a service region is already equipped with mesh-enabled transmitting-receiving devices or also transmitting devices in or at or as part of the illumination devices or the lighting devices or the illuminants. Now, only one of the present transmitting-receiving devices or transmitting devices has to be exchanged or an additional transmitting-receiving device or transmitting device has to be additionally installed in the service region. Therein, the new transmitting-receiving device or transmitting device preferably comprises a current firmware version and integrates itself in the present mesh network. The firmware version can be both a software version and an update version. A combination hereof can also be provided. The new transmitting-receiving device can now for example query the version number of installed firmware and computer programs, respectively, from other present transmitting-receiving devices via the mesh network and transfer the own current firmware via it to the other transmitting-receiving devices by communicating corresponding data via the communication link. The communication can be dependent on the fact that the present transmitting-receiving devices comprise an older firmware. This concept can also be referred to as automatic distribution of the data by means of retrofit.

Moreover, there is the possibility that an, in particular primary, transmitting-receiving device has access to a mobile data network such as for example GSM or the like. This access can for example be effected via an integrated hotspot by means of a SIM card. The transmitting device or transmitting-receiving device can always obtain the data with respect to the current computer program from the central infrastructure via this access. The method for distributing to the transmitting devices or transmitting-receiving devices located in the environment can be effected according to the already above described method. The method of the invention further allows enabling function modification of the transmitting device or transmitting-receiving device also after first-time startup within the scope of a firmware update in a service region. Therein, functions of transmitting devices or transmitting-receiving devices in or at or as part of the illumination system or the illumination device or the illuminant can both be enabled and turned off. For example, the possibility of offering a preset functionality in a service region in chargeable manner results from it.

Thus, enabling a possible mesh function after first-time startup can for example be provided. Transmitting-receiving devices can be subsequently modified to mesh-enabled transmitting-receiving devices, for example for a fee to a manufacturer, on condition that this functional change is available on the hardware side. The corresponding modified, thus mesh-enabled, transmitting-receiving devices can then form a meshed communication network with each other, that is each of the transmitting-receiving devices can function as a network node, which can be connected to one or more other transmitting-receiving devices in the same installation region, preferably in wireless manner, and/or via the communication network of the illumination system, for example according to the BLE standard. Data can then be communicated and thereby distributed from node to node within this meshed network.

This can for example be effected according to the following steps:

1. Based on an IT infrastructure, the transmitting devices or transmitting-receiving devices integrated in the illumination devices of the illumination system can be accessed via the communication channel of a light management system of the illumination system. Therein, the light management system can be understood as an initial communication system of the overall system, which is used for distributing the data for function modification.

2. In a next step, the data can be downloaded to and installed on the transmitting devices or transmitting-receiving devices such as for example beacons or the like. The mesh-enabled transmitting-receiving devices can then serve as a second, redundant mesh communication system of the overall system, for example for backing up the light management system or the like.

3. The transmitting-receiving devices can preferably comprise an, in particular wireless, backward channel. The backward channel—an equivalent to a communication link—can for example be realized via the mesh network of the overall system and can be connected to the IT infrastructure. Thus, information to the system status of the illumination system can for example be communicated to a data processing and evaluated, for example within the scope of condition monitoring or the like. Therein, the following variants of the backward channel can be provided:

4. It can be provided that data, for example with respect to a status of the illumination system, is first communicated from each of the transmitting-receiving devices of the illumination system to the, in particular primary, transmitting-receiving device. Subsequently, the primary transmitting-receiving device communicates the data to the data processing via the light management system and the gateway.

Moreover, there is the possibility of immediately passing such data from each transmitting-receiving device of the illumination system to the data processing via the gateway.

Furthermore, there is the possibility of first communicating such data from each transmitting-receiving device of the illumination system to the, in particular primary, transmitting-receiving device and subsequently immediately communicating the data by the, in particular primary, transmitting-receiving device to the data processing via the gateway.

Further, it is proposed that the data is provided via a communications terminal. In this manner, a communication link can be established between the transmitting device or the beacon on the one hand and the data source on the other hand by means of the communications terminal. Thereby, the transmitting device or the beacon does not have to be formed to be able to establish a separate communication link with the data source. For example, it can be provided that the communication link with the data source is established in automated manner as soon as the communications terminal is in communication range to the transmitting device or the beacon. However, it can moreover also be provided that an active input of a user of the communications terminal is required for establishing this communication link. Thus, it can be provided that the user gets displayed a message on a display unit of the communications terminal that this communication link can be established upon manual input of the user. Here, it is thus not required to provide a separate gateway to be able to establish the desired communication link. The communications terminal can for example be integrated in the transmitting device or the beacon.

Fundamentally, it can also be provided that the transmitting device or the beacon is formed to be communicatively integrated in a mobile radio network. For this purpose, it can further be provided that the transmitting device or the beacon is formed for accepting a corresponding authorization, for example in that a SIMM card or the like can be arranged, in particular connected, in the transmitting device or the beacon. The illumination device can then establish a communication link immediately via the mobile radio network via the respective mobile radio network, in particular with the data source.

Finally, it is proposed that the data source is at least partially provided by the communications terminal. Thus, the data source can preferably be encompassed by the communications terminal, for example in that a storage unit of the communications terminal includes a database, which is associated with the data source, or the like.

The implementation variants as well as advantages and effects specified with respect to the method according to the invention analogously similarly also apply to the illumination system according to the invention as well as vice versa. Therein, respective method features can be regarded as functional features for means suitable hereto.

BRIEF DESCRIPTION OF THE DRAWINGS

Further advantages and features are apparent by the embodiments specified in the following based on the attached figures. In the figures, identical reference characters denote identical features and functions.

There show.

DESCRIPTION OF THE PREFERRED EMBODIMENTS

Figure 1:
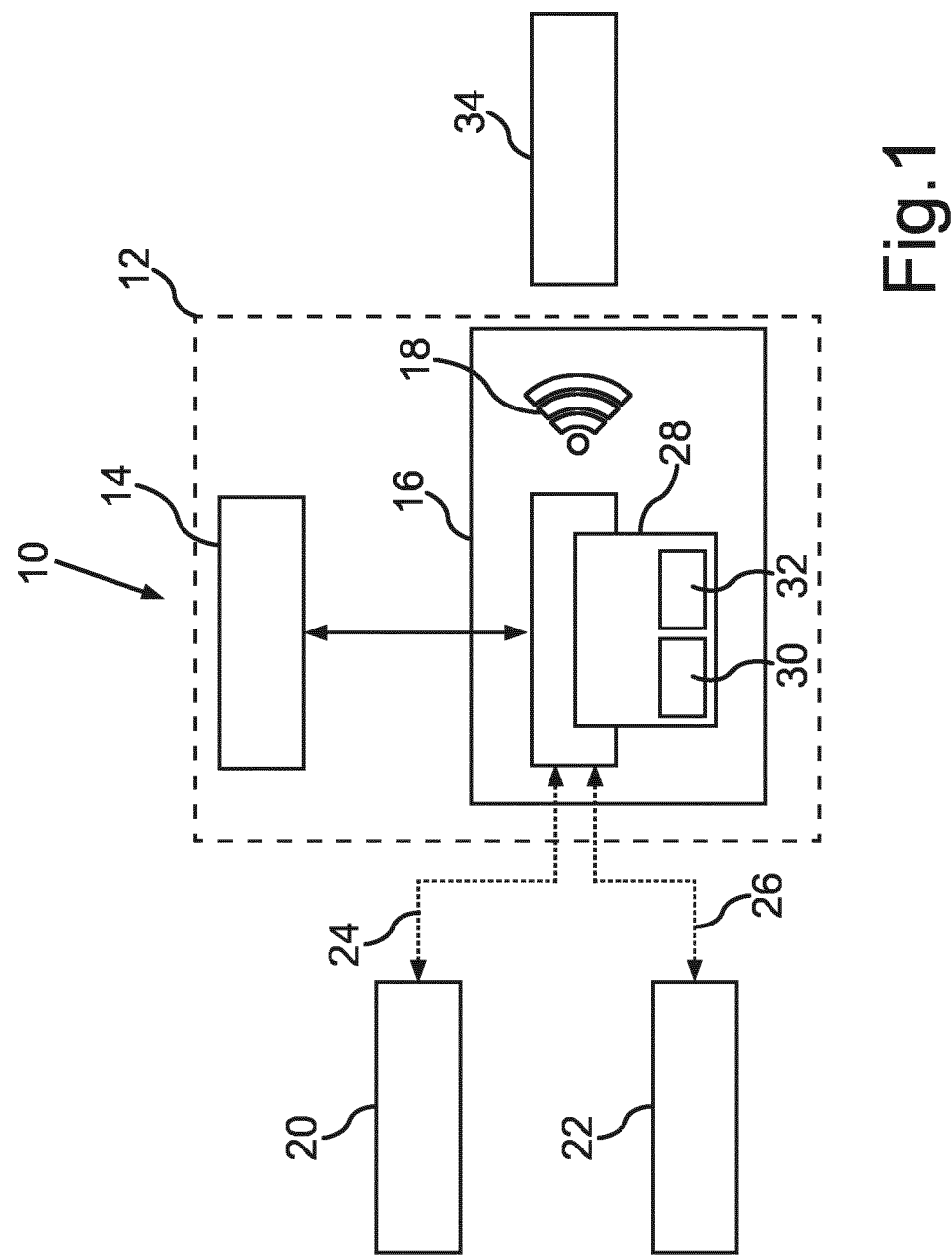
FIG. 1 in a schematic block diagram an integration of a beacon as a transmitting device in an illumination device of an illumination system comprising multiple illumination devices, FIG. 2 a schematic block diagram of a first configuration for an illumination system according to the invention, FIG. 3 a schematic block diagram of a second configuration for an illumination system according to the invention, FIG. 4 a schematic block diagram of a third configuration for an illumination system according to the invention, FIG. 5 a schematic block diagram of a fourth configuration for an illumination system according to the invention, and FIG. 6 a schematic block diagram of a fifth configuration for an illumination system according to the invention.

FIG. 1 shows an illumination system 10 in a schematic block diagram, which includes a plurality of illumination devices 12, 20. Each of the illumination devices 12, 20 comprises a lighting device 14 with one or also more illuminants not further illustrated for emitting light as well as a beacon 16 as a transmitting device. The beacon 16 is arranged in or immediately at the lighting device 14. The beacon 16 wirelessly emits a signal 18 with identification information specific to the beacon 16. Presently, emitting is effected using near-field radio based on a Bluetooth Low Energy (BLE) protocol.

The beacon 16 includes a control unit 28, which includes a computer unit 30 as well as a storage unit 32 communicatively coupled to the computer unit 30. An executable computer program for the computer unit 30 is stored in the storage unit 32 such that a preset functionality can be provided by the computer unit 30. Presently, the functionality serves for operating the beacon 16 as well as also the lighting device 14 in presettable manner. The further illumination devices 20 are fundamentally constructed comparable to the illumination device 12.

Presently, the beacon 16 is formed as a transmitting-receiving device, which can also use a bidirectional communication link 24 besides the emission of the signal 18. The illumination device 12, and here in particular the beacon 16, is in communication link with the further illumination devices 20, which are correspondingly formed, via the communication link 24.

The communication link 24 is presently a bidirectional communication link, which is also based on near-field radio and uses the above mentioned BLE standard. Moreover, the illumination device 12 and here also again in particular the beacon 16 is in communication link with an infrastructure device 22 via a further communication link 26, via which data relating to an intended operation of the illumination device 12 as well as also data with respect to the further illumination devices 20 can be exchanged. Accordingly, the illumination device 12 and here in particular the beacon 16 thereof also serve as a device for forwarding corresponding data from the infrastructure device 22 to the illumination devices 20 and vice versa at the same time, for example in the manner of a network node.

The signal 18 emitted by the beacon 16 or the beacons of the illumination devices can be received and evaluated by one or also multiple communications terminals 34. The communications terminal 34 is presently a mobile radio terminal in the manner of a smartphone. In the present configuration, it is only provided that the communications terminals 34 receive and evaluate the signal 18. Therefore, communication is only unidirectionally effected. Non-illustrated beacons of the further illumination devices 20 can also be received by the communications terminal 34. Thereby, a series of services can be provided or allowed by means of the communications terminal 34, which allows a user of the communications terminal 34 to use very different additional services. Within a preset region, in which the illumination devices 12, 20 are arranged and in which the signal 18 can be received by the communications terminal 34, the user of the communications terminal 34 can thereby better orient himself and navigate, respectively, as well as also locate and use other local, in particular digital, services, such as for example apps, app functions, Google Maps, Lightify, light control and/or the like. The illumination system 10 with the beacons 16 arranged in the respective illumination devices 12, 20 allows a localization and orienting system, respectively, for the above mentioned user potentials. In particular, it is possible to provide an accurate self-localization of the communications terminal 34, whereby services become usable, such as for instance the navigation or the provision of location-specific information.

An aspect of the beacon technology is the possibility of configuration of typical parameters such as for example a signal strength and/or a transmission interval of the signal 18 of the beacon 16. With different configurations, different application scenarios can be individually supported. For example, if high service quality, for example accurate localization in short intervals, is desired, as it is in particular required in indoor navigation, very short transmission intervals can preferably be configured.

Figure 2:
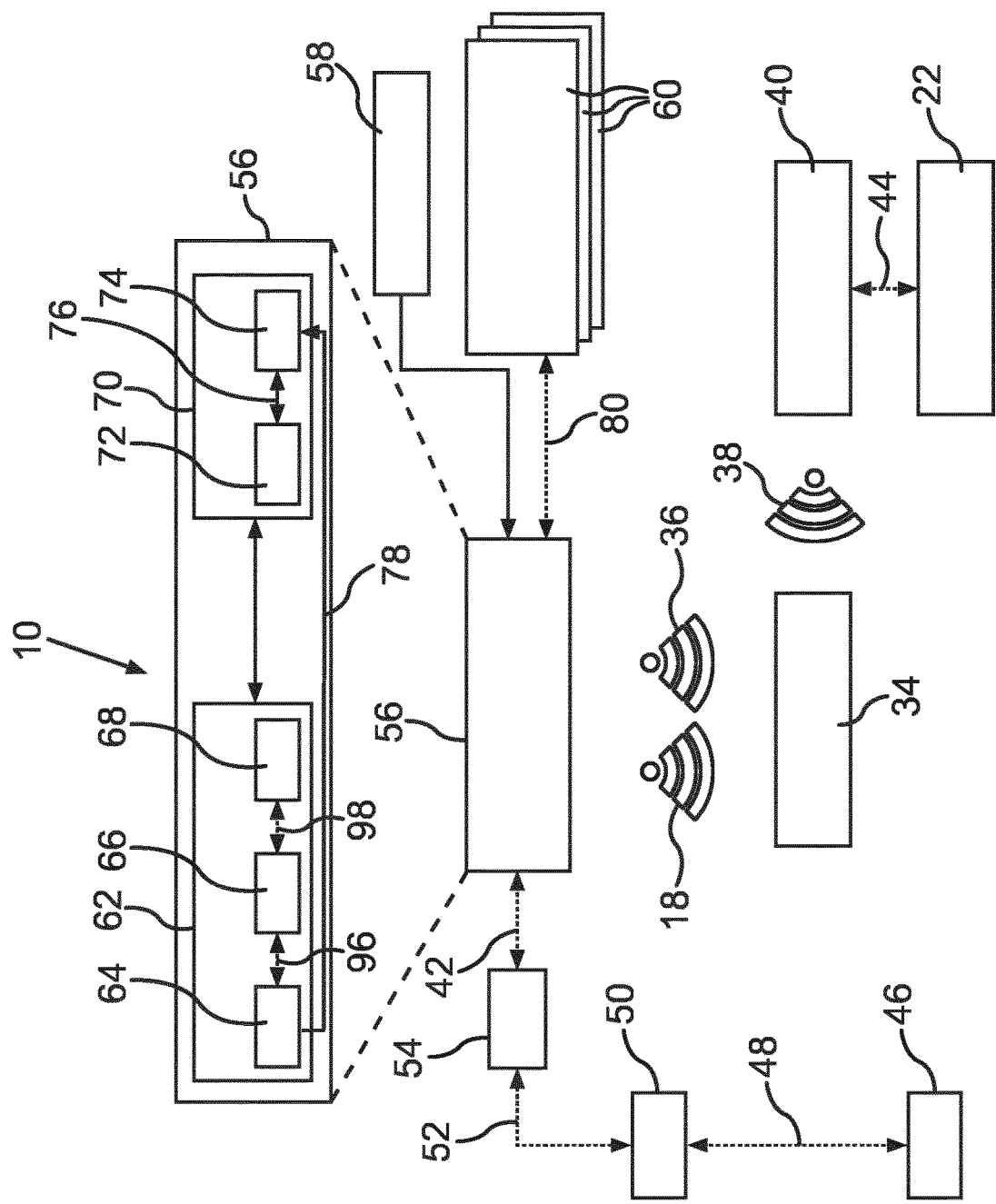

FIG. 2 shows a configuration for an illumination system 10 in a schematic block diagram, which is based on the above already described illumination system 10. Here too, the illumination system 10 includes a plurality of illumination devices 56, 60 controlled by means of a respective computer unit 30, which are fundamentally based on the illumination devices 12, 20—as described to FIG. 1. The illumination device 56 is exemplarily illustrated with its components in an upper area of FIG. 2. Here, the computer unit 30 is a constituent of a control unit 72, which fundamentally corresponds to the control unit 28—as also described to FIG. 1—and which in turn is part of a beacon 70 as a transmitting device. Therefore, the beacon 70 is fundamentally based on the beacon 16, as it was already described to FIG. 1, with respect to its function. Presently, the beacon 70 is again arranged at or in or as part of a lighting device 62, which is also a constituent of the illumination devices 56, 60 and which emits light in presettable manner.

As is apparent from the upper area of FIG. 2, the lighting device 62 presently includes an electronic ballast 64, an energy interface 66, which is connected to the electronic ballast 64 via an energy transfer channel 96, as well as a light emitting diode assembly 68, which is connected to the energy interface 66 via a further energy transfer channel 98. The light emitting diode assembly 68 is supplied with electrical energy in presettable manner by the electronic ballast 64 via the energy transfer channels 96, 98 such that the lighting device 62 emits light in presettable manner.

Further, the electronic ballast 64 supplies an energy interface 74 of the beacon 70 via an energy transfer channel 78, which supplies the control unit 72 with electrical energy via an energy transfer channel 76. Thereby, the beacon 70 can be operated in presettable manner, in particular for emitting the signal 18. From FIG. 2, it is further apparent that the lighting device 62 emits light, which is denoted by the reference character 36. The illumination device 56 is further connected to a mains supply 58, which obtains electrical energy from a public energy supply network and provides it to the illumination device 56.

The signal 18, which is emitted by the beacon 70, can—as already explained to FIG. 1—be received by means of the communications terminal 34 and serve for providing further uses or services. Moreover, the communications terminal 34 can be in communication link with a router 40 via a communication link 38, which is formed as a near-field radio link. The router 40 is connected to an infrastructure device 22 via a wired communication link 44, which presently provides access to the Internet or to a central service server like the infrastructure device 22 according to FIG. 1.

The illumination device 56 is presently further connected to a light management system 54 by means of a communication link 42. The light management system 54 in turn is connected to a gateway 50 via a communication link 52 and it is connected to a content management system 46 via a communication link 48. Thereby, data can be provided to the illumination device 56 from the content management system 46. Presently, only the illumination device 56 is provided for substantially immediate connection to the content management system 46.

Furthermore, further illumination devices 60 are provided in the illumination system 10, only three of which are illustrated in FIG. 2, which are each in communication link with the illumination device 56 via a communication link 80. The communication link 80 is presently a mesh communication link using near-field radio based on the BLE standard.

Presently, it is provided that the illumination devices 56, 60 each include a computer unit 30, which serves for the control thereof. For this purpose, an executable computer program is provided in each of the illumination devices 56, 60.

For installing or changing the executable computer program, data corresponding to the computer program to be installed or to be changed is provided from the content management system 46 as the data source, the data is communicated to the illumination devices 56, 60 and the computer program is installed in the respective computer units 30 of the illumination devices 56, 60 in automated manner or an already installed computer program is changed in automated manner based on the communicated data.

In the present configuration, it is provided that a first one of the illumination devices, here the illumination device 56, obtains the data from the content management system 46 via the gateway 50 and the light management system 54 and either installs the computer program corresponding to the data or changes a present computer program corresponding to the data.

Moreover, it is provided that for installing or changing the computer program in second ones of the illumination devices, here the illumination devices 60, the first illumination device 56 communicates the data to the illumination devices 60 via the communication link 80. There, the computer program is then also installed corresponding to the data or a present computer program is correspondingly changed. The computer program can in particular be firmware.

Thus, it is no longer required in this configuration to communicatively couple each individual one of the illumination devices 56, 60 and to perform an individual installation or change of the computer program for updating the firmware. Only at least one of the illumination devices, here the illumination device 56, has to be supplied with the corresponding data, which is then communicated to the further illumination devices, here the illumination devices 60, in automated manner. The corresponding computer program is then installed or changed in all of the illumination devices 56, 60.

Figure 3:
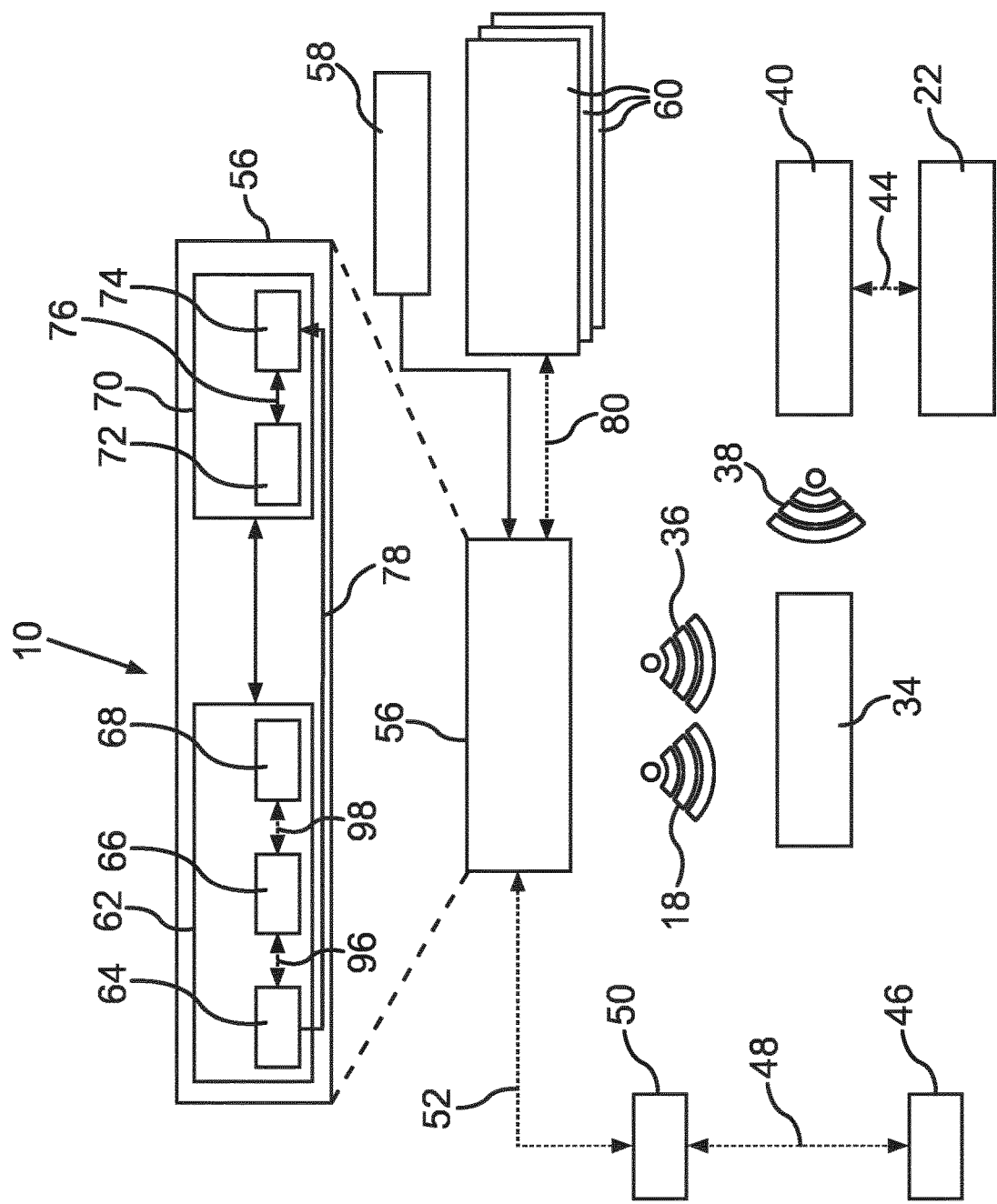

FIG. 3 shows a schematic block diagram for a further configuration of an illumination system 10, as it was already explained in detail based on FIG. 2. In contrast to the configuration according to FIG. 2, it is provided in the configuration according to FIG. 3 that the gateway 50 is immediately connected to the illumination device 56 via the communication link 52. A light management system like the light management system 54 in FIG. 2 is not required and interposed here, respectively. However, the functional extent otherwise corresponds substantially to that what has already been explained to FIG. 2, wherefore reference is additionally made to these explanations.

Here too, the illumination device 56 obtains the data for installing or changing the executable computer program from the content management system 46 as the data source. Here, only the gateway 50 is interposed.

Figure 4:
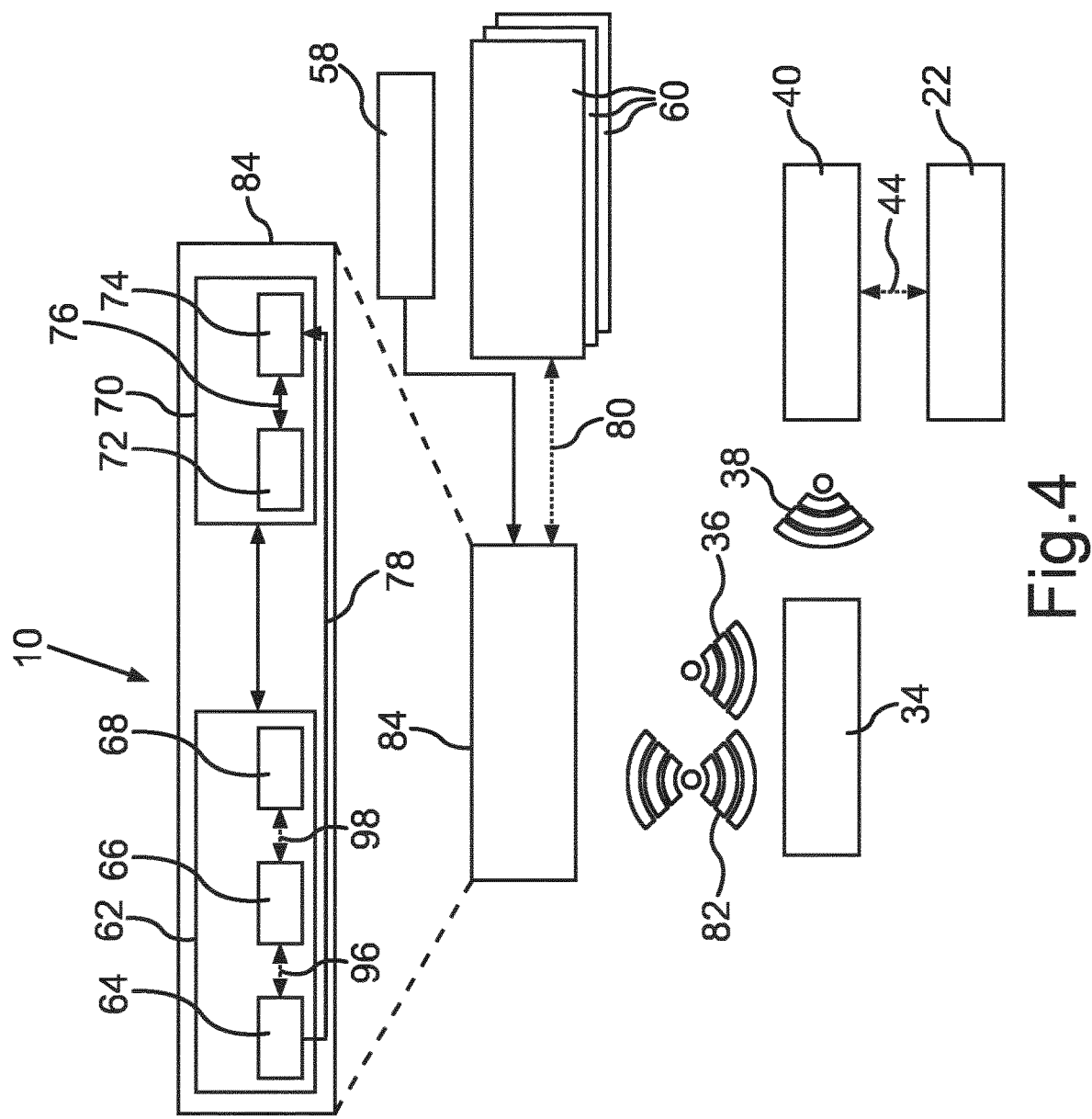

FIG. 4 shows a schematic block diagram for a further configuration of an illumination system 10 as it has already been explained based on FIGS. 2 and 3, wherefore reference is additionally made to the explanations to these embodiments.

In contrast to the previous embodiments, the data is provided by the communications terminal 34 in the embodiment according to FIG. 4. For this purpose, the beacon 70 of the illumination device 56 is presently formed for bidirectional communication by means of a wireless communication link 82. Here, the beacon 70 is thus not only a transmitting device, but a transmitting-receiving device. In contrast, the further beacons of the illumination devices 60 can further be pure transmitting devices. However, they can basically also be formed as a transmitting-receiving device.

The communications terminal 34 serves as a data source in this configuration. The communications terminal 34 is brought in communication link with an illumination device 84, which is here provided instead of the illumination device 56 in the preceding embodiments. The illumination device 84 differs from the illumination device 56 of the preceding embodiments substantially in that the beacon 70 here also provides a receiving function.

The data is communicated from the communications terminal 34 to the illumination device 84, which correspondingly installs or changes the computer program. The data received by the illumination device 84 is then again communicated to the further illumination devices 60 via the communication link 80 such that the computer program is correspondingly installed or changed also in these illumination devices 60. Here too, only communication of the data to one of the illumination devices, namely the illumination device 84, is required. The further functionality corresponds to that, which has already been explained to the preceding embodiments.

Figure 5:
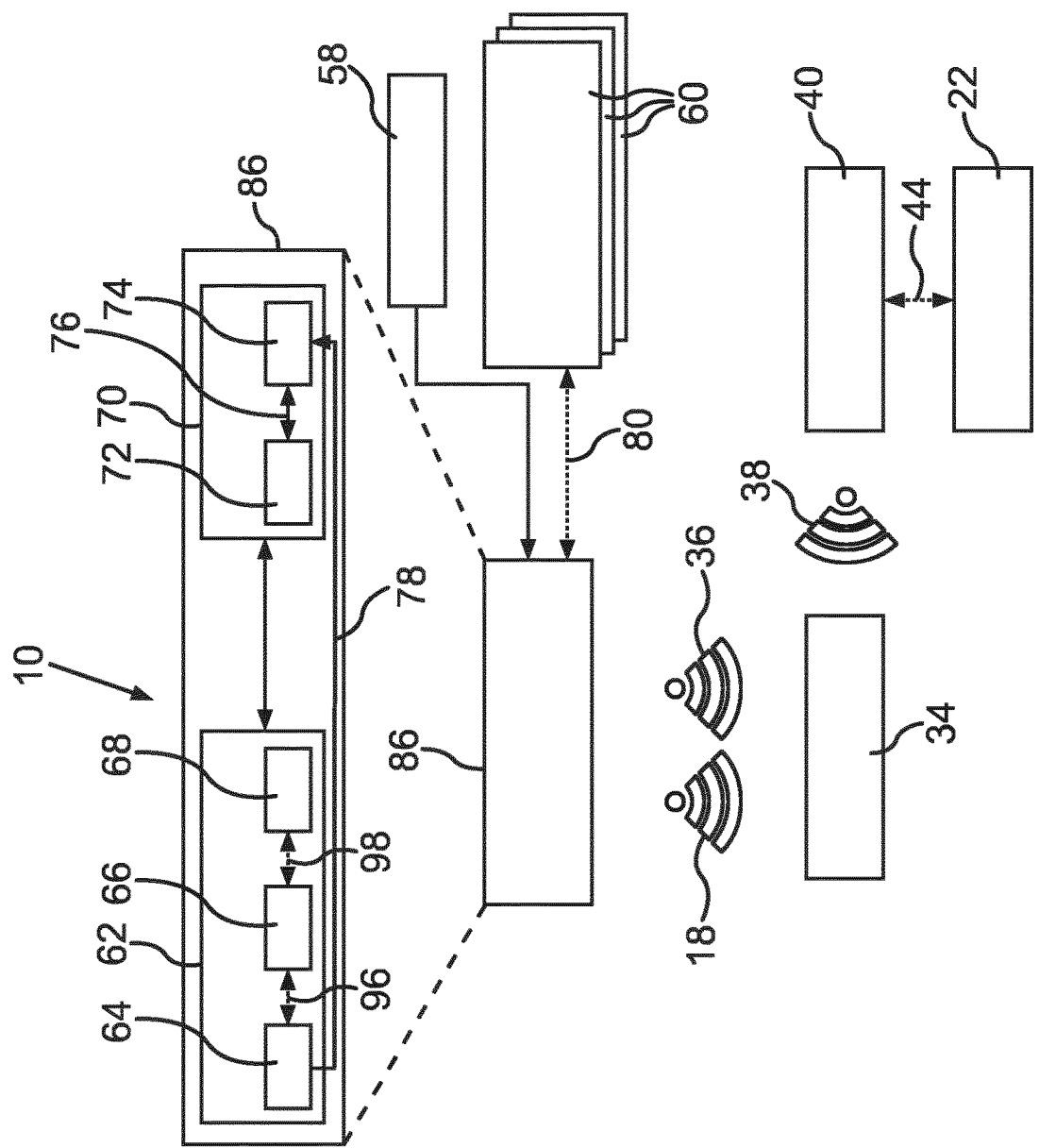

FIG. 5 shows a schematic block diagram for a further configuration of an illumination system 10, which is based on the above mentioned configurations to the FIGS. 2 to 4, wherefore reference is additionally made to these explanations. In contrast to the preceding embodiments, it is presently provided that an illumination device 86 is newly installed, which already contains a current version for a computer program. The installation of the illumination device 86 can be effected within the scope of new installation or also maintenance or exchange of the illumination device. Therefore, the illumination device 86 was already provided with the data before it was installed, which is required for the current computer program. Correspondingly, the computer program is already installed or changed.

In this configuration, it is provided that the illumination device 86 enters in communication link with the further ones of the illumination devices 60 via the communication link 80 and communicates the data according to the current computer program to the illumination devices 60. They then install the new computer program or change the present computer program. Here too, the supply of the data is only required in one of the illumination devices, here the illumination device 86. The further update of the computer programs of the further illumination devices 60 is then effected in automated manner.

The remaining functions with respect to the beacon functionality as well as also the lighting devices correspond to those, which have already been explained to the preceding embodiments.

Figure 6:
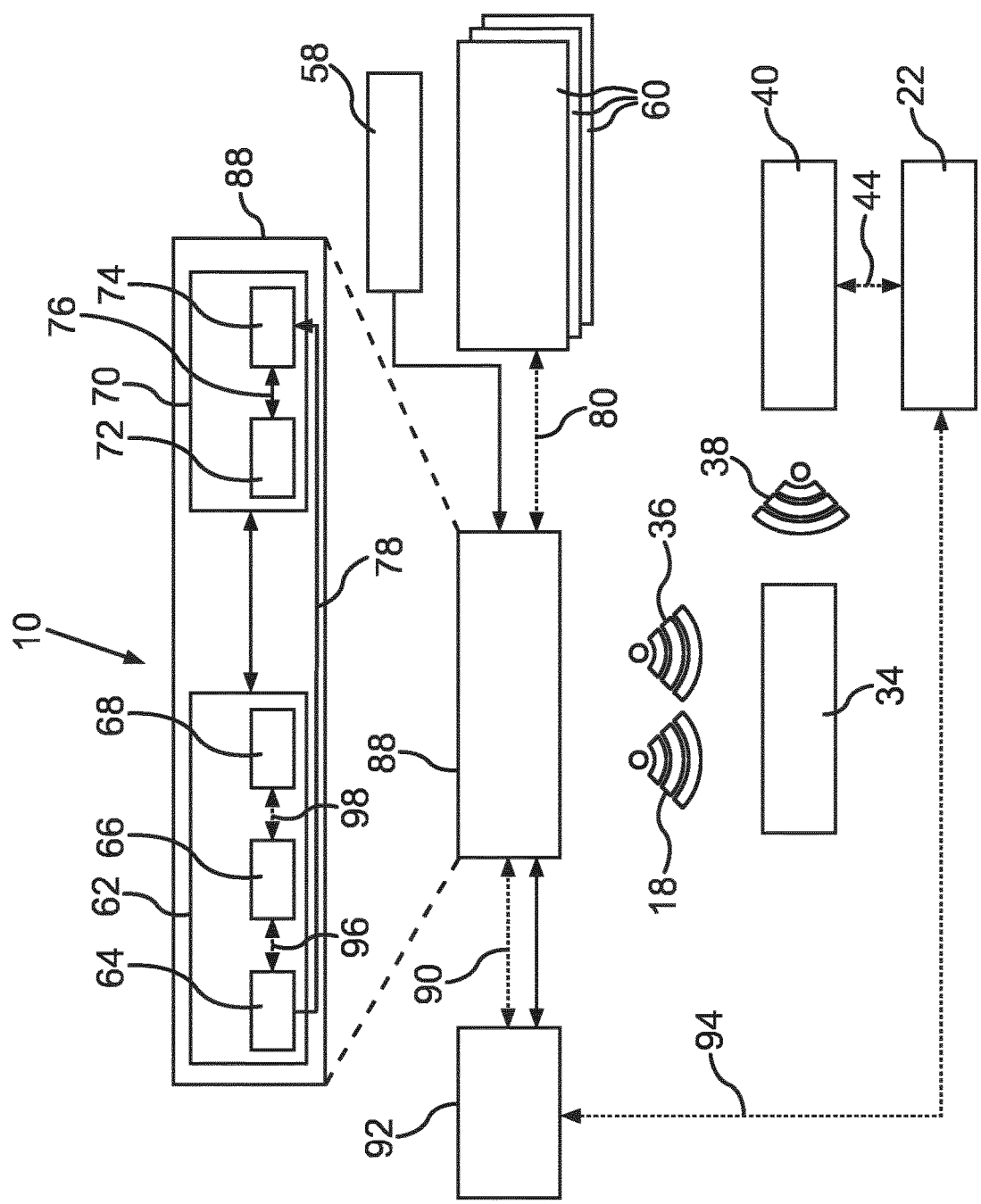

FIG. 6 shows a schematic block diagram of a further configuration of an illumination system 10, which also is based on the above already explained embodiments, wherefore reference is additionally made to these explanations. In contrast to the preceding embodiments, an illumination device 88 is here provided, which is connected to an access appliance 92 via a communication link 90. Here, the access appliance 92 serves as an access appliance to a mobile data network not further denoted. The access appliance 92 is connected to the infrastructure device 22 via a mobile radio link 94. The infrastructure device 22 presently includes the data source, which provides the data for the computer program to be installed or to be changed.

Thus, the illumination device 88 obtains the data from the infrastructure device 22 via the access appliance 92, which corresponds to the current computer program. After the data is present in the illumination device 88, the computer program is installed or correspondingly changed. Then, the data is distributed to the further illumination devices 60 via the communication link 80—as already explained in the preceding embodiments—which then also correspondingly install or update the computer program. Here too, the supply of the data is only required in a single one of the illumination devices, namely here the illumination device 88.

Even if only a single one of the illumination devices gets externally supplied the data, it can of course be provided that two or more of the illumination devices also get supplied the data and then correspondingly distribute it to further illumination devices.

The embodiments only serve for explaining the invention and are not intended to restrict it.

The invention claimed is:

1. A method for installing or changing an executable computer program in an illumination system with a plurality of illumination devices controlled by a respective computer unit, wherein each of the illumination devices comprises a lighting device and a transmitting device arranged in or immediately at the lighting device, wherein the transmitting device wirelessly emits a signal with identification information specific to the transmitting device, the method comprising:

providing data corresponding to the computer program to be installed or to be changed from a data source, communicating the data to the illumination devices, and installing the computer program in the respective computer units of the illumination devices in an automated manner or changing an already installed computer program in an automated manner based on the communicated data, wherein the installation of the change of the computer program is effected at a preset point of time;

wherein a communication link exists between the illumination devices, a first one of the illumination devices obtains the data from the data source and for installing or changing the computer program in at least a second one of the illumination devices, the first one of the illumination devices communicates the data to the at least one second one of the illumination devices via the communication link.

2. The method according to claim 1, wherein data for installing or changing the computer program of the second one of the illumination devices is examined in the second one of the illumination devices.

3. The method according to claim 1, wherein the second one of the illumination devices communicates the data to at least one further one of the illumination devices via the communication link.

4. The method according to claim 1, wherein the communication link is terminated after communicating the data.

5. The method according to claim 1, wherein the data is stored at least at the first one of the illumination devices in a storage unit of the illumination device.

6. The method according to claim 1, wherein the data is communicated from the first illumination device to the at least one second one of the illumination devices only after installing or changing the computer program of the first illumination device.

7. The method according to claim 1, wherein the point of time at least depends on an operating state of the respective illumination device.

8. The method according to claim 1, wherein the point of time for installing or changing the computer program depends on installation or change information contained in the data.

9. The method according to claim 1, wherein
the point of time depends on availability of electrical energy for an intended operation of the respective illumination device.

10. The method according to claim 1, wherein
the first one of the illumination devices recognizes a new second illumination device and communicates the data to the new second one of the illumination devices in an automated manner.

11. The method according to claim 1, wherein
the data is only communicated to second illumination devices in a preset spatial region and/or with a preset spatial distance to the first illumination device.

12. The method according to claim 1, wherein
at least one presettable active functionality of the illumination device is deactivated and/or a preset deactivated functionality is activated during installation or change of the computer program.

13. The method according to claim 1, wherein
a functionality available in a respective one of the illumination devices is activated or deactivated by the installation or the change of the computer program.

14. The method according to claim 1, wherein
the data is provided via a communications terminal.

15. The method according to claim 1, wherein
the data source is at least partially provided by a communications terminal.

16. The method according to claim 1, wherein
the said lighting device and the respectively assigned one of the transmitting devices are in a communication link via a BUS.

17. A method for installing or changing an executable computer program in an illumination system with a plurality of illumination devices, wherein each of the illumination devices comprises a lighting device, a transmitting device arranged in or immediately at the lighting device and a respective computer unit, wherein the transmitting device wirelessly emits a signal with identification information specific to the transmitting device, the method comprising:
providing data corresponding to the computer program to be installed or to be changed from a data source,
communicating the data to the illumination devices, and
installing the computer program in the respective computer units of the illumination devices in an automated manner or changing an already installed computer program in an automated manner based on the communicated data, wherein the installation of the change of the computer program is effected at a preset point of time;
wherein
a communication link exists between the illumination devices,
a first one of the illumination devices obtains the data from the data source, and for installing or changing the computer program in at least a second one of the illumination devices, the first one of the illumination devices communicates the data to the at least one second one of the illumination devices via the communication link.

18. An illumination system comprising:
a plurality of illumination devices controlled by a respective computer unit, wherein each of the illumination devices comprises a lighting device and a transmitting device arranged in or immediately at the lighting device, wherein the transmitting device is formed to wirelessly emit a signal with identification information specific to the transmitting device,
a data source connection for connecting to a data source providing data corresponding to a computer program to be installed or to be changed,
wherein the illumination devices are configured to install the computer program in the respective computer units of the illumination devices in an automated manner or to change an already installed computer program in an automated manner based on the communicated data, wherein the installation of the computer program or the change to an already installed computer program is effected at a preset point of time;
wherein
a communication link exists between the illumination devices,
at least a first one of the illumination devices is formed to obtain the data from the data source, and
for installing or changing the computer program in at least one second one of the illumination devices, the first one of the illumination devices is formed to communicate the data to the at least one second one of the illumination devices via the communication link.

19. An illumination system comprising:
a plurality of illumination devices, wherein each of the illumination devices comprises a lighting device, a transmitting device arranged in or immediately at the lighting device and a respective computer unit, wherein the transmitting device is formed to wirelessly emit a signal with identification information specific to the transmitting device,
a data source connection for connecting to a data source providing data corresponding to a computer program to be installed or to be changed, wherein the illumination devices are configured to install the computer program in the respective computer units of the illumination devices in an automated manner or to change an already installed computer program in an automated manner based on the communicated data, wherein the installation of the computer program or the change to an already installed computer program is effected at a preset point of time;
wherein
a communication link exists between the illumination devices,
at least a first one of the illumination devices is formed to obtain the data from the data source, and
for installing or changing the computer program in at least one second one or the illumination devices, the first one of the illumination devices is formed to communicate the data to the at least one second one of the illumination devices via the communication link.

* * * * *